US012666060B2

(12) United States Patent　　　　　(10) Patent No.:　US 12,666,060 B2
Lee et al.　　　　　　　　　　　　　　　(45) Date of Patent:　Jun. 23, 2026

(54) METHOD FOR ENCODING/DECODING VIDEO AND RECORDING MEDIUM STORING THE METHOD FOR ENCODING VIDEO

(71) Applicant: Electronics and Telecommunications Research Institute, Daejeon (KR)

(72) Inventors: Gwang Soon Lee, Daejeon (KR); Jun Young Jeong, Daejeon (KR); Adrian Dziembowski, Poznań (PL); Dawid Mieloch, Poznań (PL); Marek Domański, Poznań (PL)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 18/640,930

(22) Filed: Apr. 19, 2024

(65) Prior Publication Data

US 2024/0357135 A1　　　Oct. 24, 2024

(30) Foreign Application Priority Data

Apr. 21, 2023　(KR) ........................ 10-2023-0052730
Apr. 18, 2024　(KR) ........................ 10-2024-0052330

(51) Int. Cl.
　　*H04N 19/00*　　　(2014.01)
　　*H04N 19/132*　　(2014.01)
　　*H04N 19/136*　　(2014.01)
　　*H04N 19/186*　　(2014.01)
　　*H04N 19/463*　　(2014.01)
(52) U.S. Cl.
　　CPC ......... *H04N 19/186* (2014.11); *H04N 19/132* (2014.11); *H04N 19/136* (2014.11); *H04N 19/463* (2014.11)

(58) Field of Classification Search
None
See application file for complete search history.

(56) References Cited

U.S. PATENT DOCUMENTS

| | | | |
|---|---|---|---|
| 2009/0244386 A1 | 10/2009 | Norgaard | |
| 2014/0037206 A1* | 2/2014 | Newton | .............. H04N 19/597 |
| | | | 382/166 |
| 2014/0210847 A1* | 7/2014 | Knibbeler | ............. G11B 20/10 |
| | | | 345/589 |
| 2015/0117791 A1* | 4/2015 | Mertens | .............. H04N 19/102 |
| | | | 382/239 |
| 2017/0105014 A1* | 4/2017 | Lee | ........................ H04N 19/85 |
| 2019/0068969 A1* | 2/2019 | Rusanovskyy | ...... H04N 19/117 |

(Continued)

FOREIGN PATENT DOCUMENTS

WO　　WO 2008/127072 A1　　10/2008

OTHER PUBLICATIONS

Dziembowski. "[MIV] Extended geometry assistance SEI" [2022] *International Organisation for Standardisation Organisation Internationale De Normalisation ISO/IEC JTC 1/SC 29/WG 4 Mpeg Video Coding*. Jul. 2022 pp. 1-10.

*Primary Examiner* — Zhihan Zhou
(74) *Attorney, Agent, or Firm* — NSIP Law

(57) ABSTRACT

A method of encoding video includes encoding a texture image, and encoding metadata for the texture image. A value of a chrominance sample expressed within an original dynamic range in the texture image is changed to a value within a changed dynamic range and encoded.

7 Claims, 8 Drawing Sheets
(2 of 8 Drawing Sheet(s) Filed in Color)

(56) References Cited

U.S. PATENT DOCUMENTS

| | | | |
|---|---|---|---|
| 2019/0110054 A1* | 4/2019 | Su ........................ | H04N 19/154 |
| 2019/0320174 A1* | 10/2019 | Ramasubramonian ...................... | |
| | | | H04N 19/124 |
| 2021/0281844 A1* | 9/2021 | Rusanovskyy ........ | H04N 19/70 |
| 2021/0360266 A1* | 11/2021 | Van Der Vleuten ... | H04N 19/98 |
| 2021/0385490 A1 | 12/2021 | Shin et al. | |
| 2023/0039038 A1* | 2/2023 | Kadu ................... | H04N 19/146 |
| 2023/0075304 A1* | 3/2023 | Zhang ..................... | G06T 9/001 |
| 2023/0281876 A1* | 9/2023 | Zhang ................. | H04N 19/597 |
| | | | 345/419 |
| 2024/0171775 A1* | 5/2024 | Su ........................ | H04N 19/20 |

* cited by examiner

【FIG. 1】
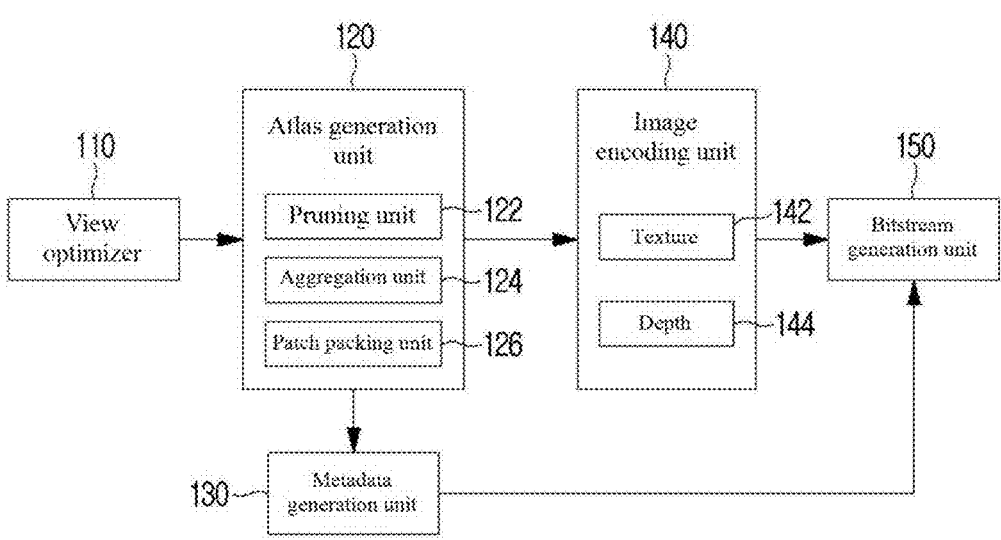

【FIG. 2】
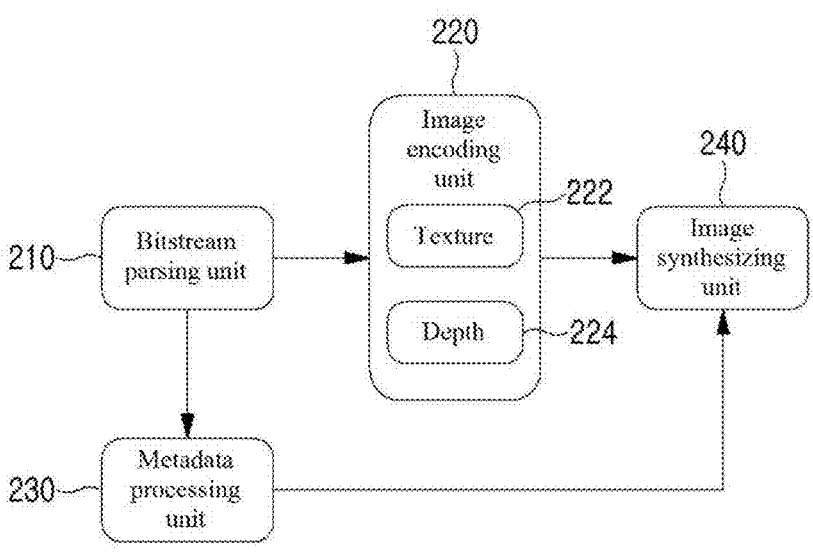

【FIG. 3】
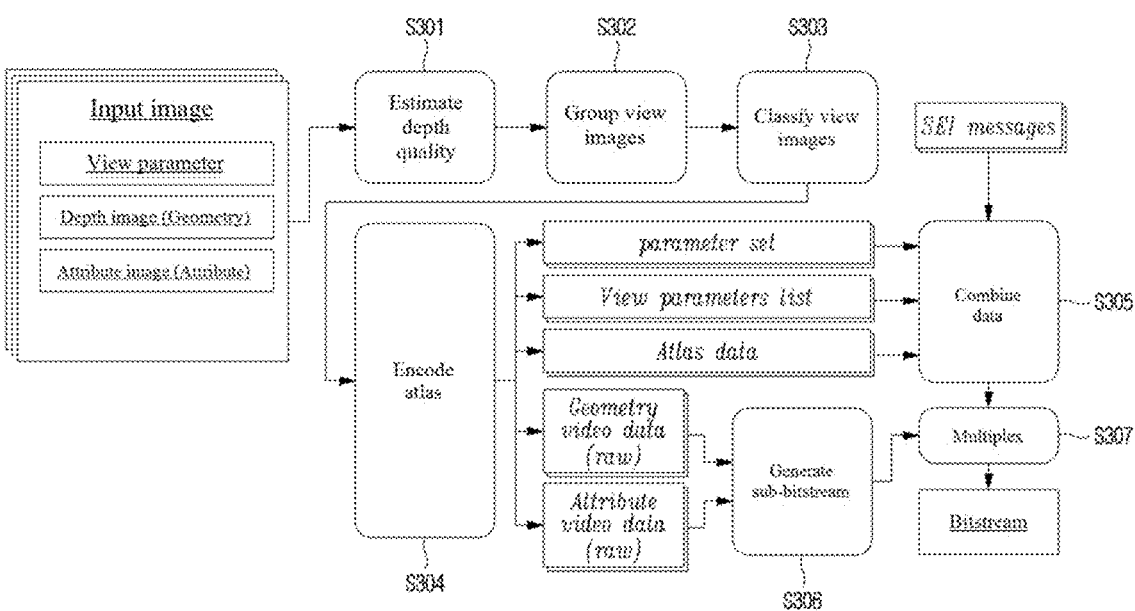

【FIG. 4】
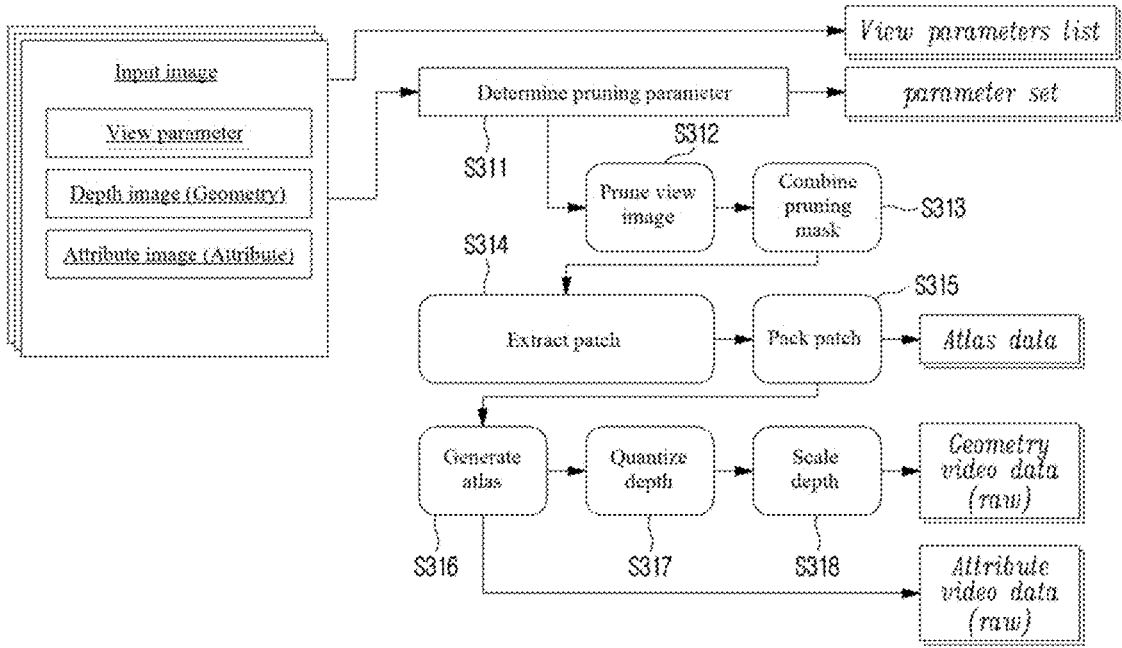

【FIG. 5】
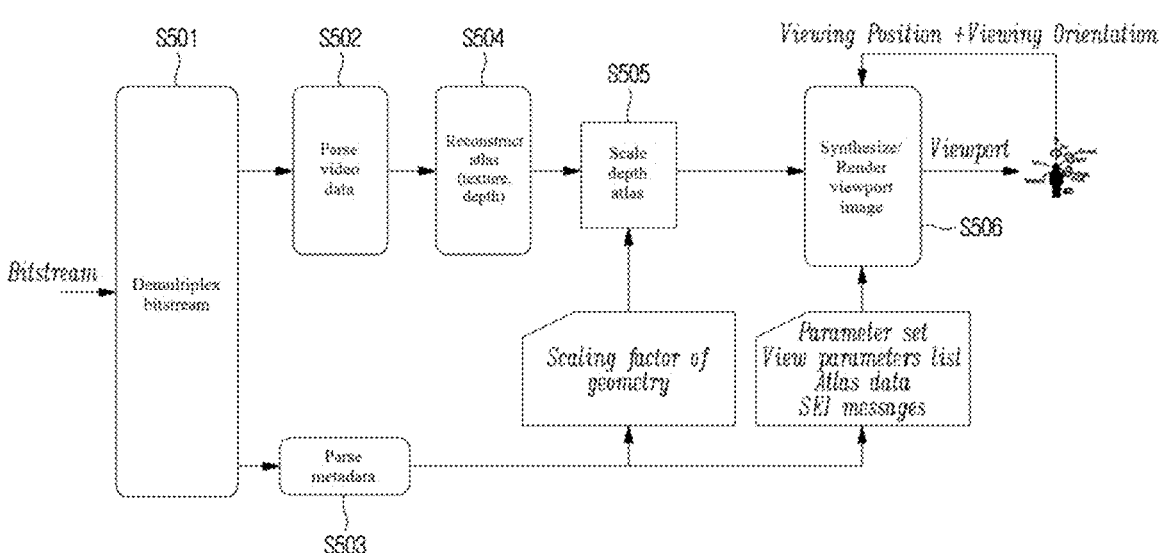

【FIG. 6】
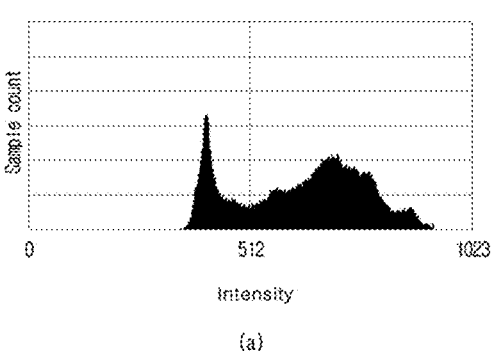
(a)
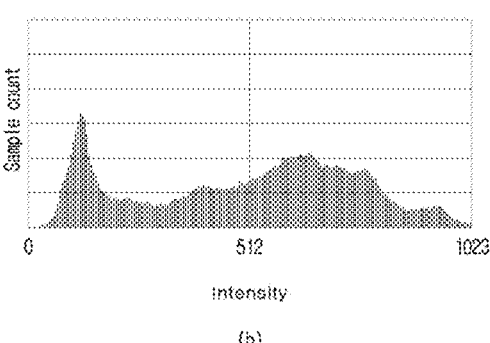
(b)

【FIG. 7】
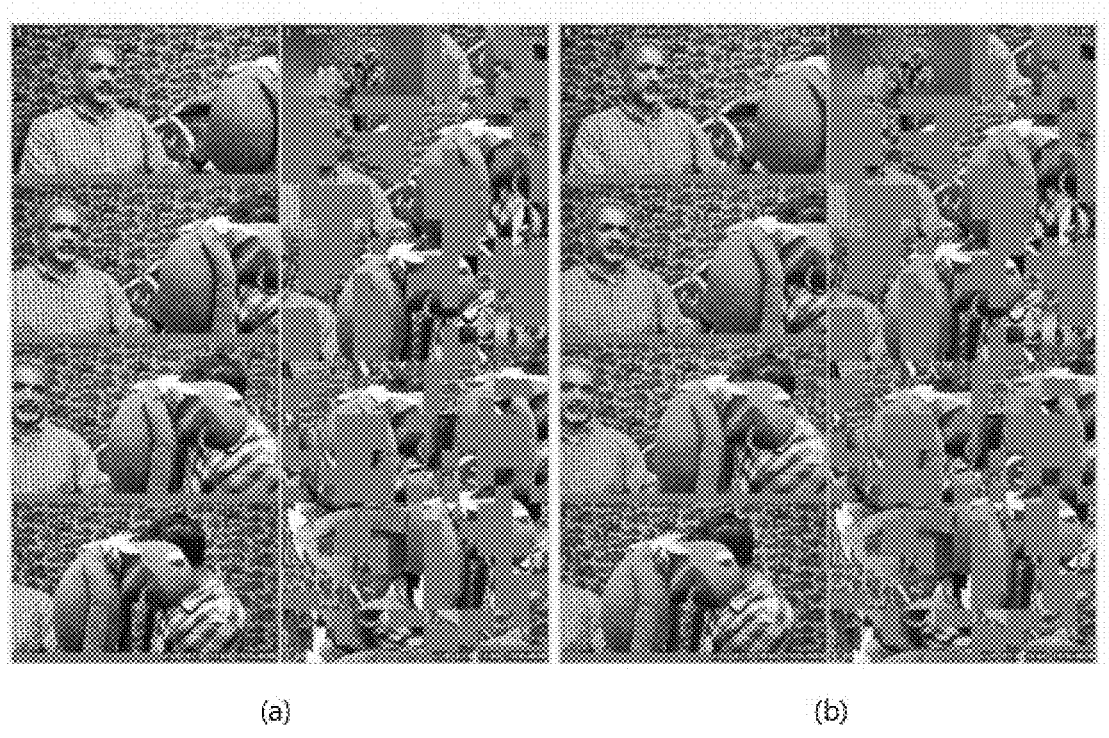
(a)                              (b)
【FIG. 8】
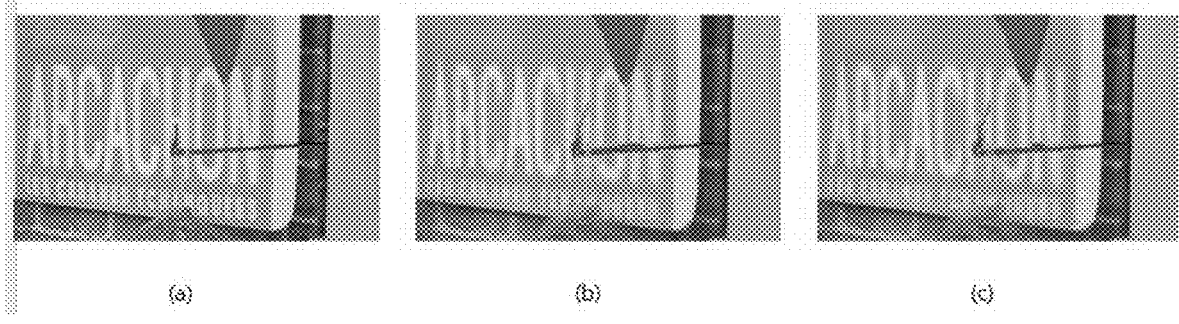
(a)                    (b)                    (c)

【FIG. 9】
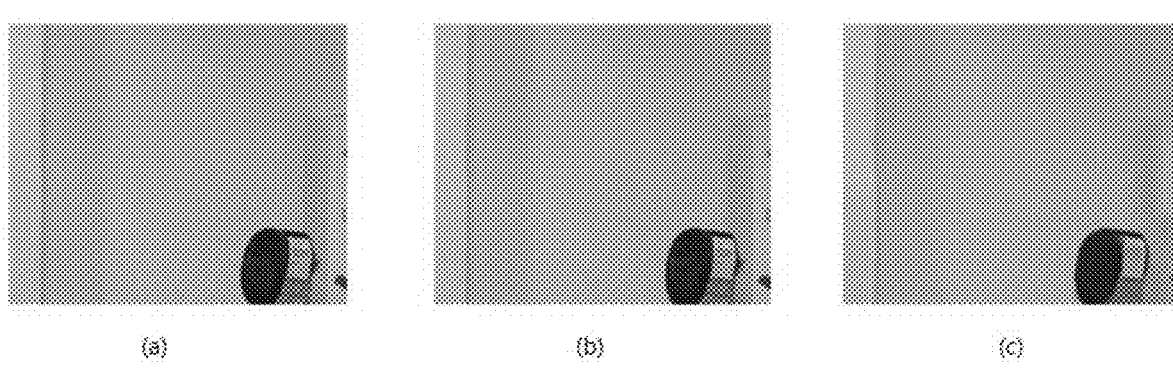
(a)                    (b)                    (c)
【FIG. 10】
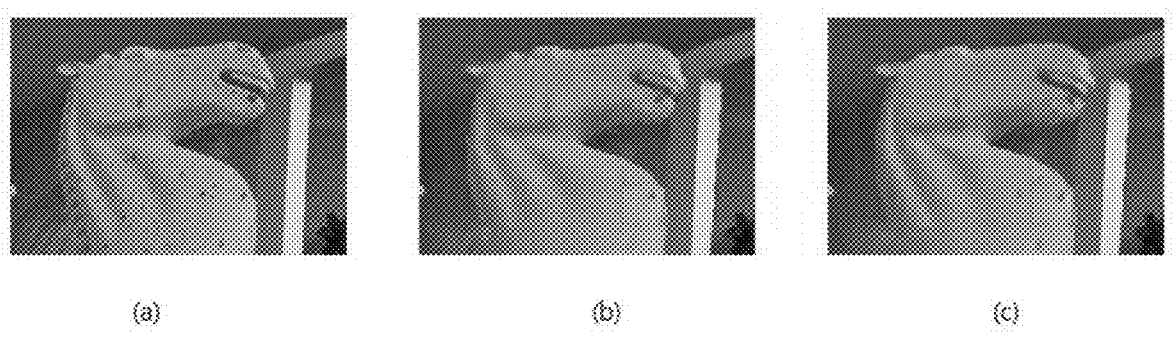
(a)                    (b)                    (c)

METHOD FOR ENCODING/DECODING VIDEO AND RECORDING MEDIUM STORING THE METHOD FOR ENCODING VIDEO

CROSS-REFERENCE TO RELATED APPLICATIONS

This application claims the benefit under 35 USC § 119 (a) of Korean Patent Application Nos. 10-2023-0052730 filed on Apr. 21, 2023 and 10-2024-0052330 filed on Apr. 18, 2024, in the Korean Intellectual Property Office, the entire disclosures of which are incorporated herein by reference for all purposes.

BACKGROUND OF THE INVENTION

Field of the Invention

The present disclosure relates to a method of encoding/ decoding immersive video that supports motion parallax for rotational and translational movement.

Description of the Related Art

Virtual reality services have been evolving to provide services that maximize immersion and realism by generating omnidirectional video in live action or CG (Computer Graphics) form and playing the video on HMDs, smartphones, etc. Currently, it has been known that, in order to play natural and immersive omnidirectional video through an HMD, 6 degrees of freedom (DoF) need to be supported. With regard to 6DoF video, free video needed to be provided through an HMD screen in six directions for (1) left and right rotation, (2) up and down rotation, (3) left and right movement, (4) up and down movement, etc. However, currently, most omnidirectional video standards based on live action merely support rotational motion. Accordingly, research has been actively underway in areas such as technology for acquisition and reproduction of 6DoF omnidirectional video.

SUMMARY OF THE INVENTION

An object of the present disclosure is to provide a method of adjusting a dynamic range of a chrominance component when encoding/decoding video.

Another object of the present disclosure is to provide a method of encoding/decoding metadata related to a dynamic range change when a dynamic range of a chrominance component is changed.

Technical problems to be solved by the present disclosure are not limited to the technical problems mentioned above, and other technical problems not mentioned herein may be clearly understood by those skilled in the art from the following description.

In accordance with an aspect of the present disclosure, the above and other objects can be accomplished by the provision of a method of encoding video including encoding a texture image, and encoding metadata for the texture image. In this instance, a value of a chrominance sample expressed within an original dynamic range in the texture image is changed to a value within a changed dynamic range and encoded.

In the method of encoding video according to the present disclosure, the metadata may include a chrominance component scaling parameter.

In the method of encoding video according to the present disclosure, the texture image may be an atlas generated by pruning a plurality of viewpoint images, and the chrominance component scaling parameter may be encoded for each of the viewpoint images.

In the method of encoding video according to the present disclosure, the chrominance component scaling parameter may include maximum value information of a chrominance component indicating a maximum value of a dynamic range before the change and minimum value information of a chrominance component indicating a minimum value of a dynamic range before the change.

In the method of encoding video according to the present disclosure, the metadata may further include an update flag indicating whether the chrominance component scaling parameter is updated for a viewpoint image of a current cycle, and when the update flag has a value indicating that the chrominance component scaling parameter is to be updated for the current cycle, the chrominance component scaling parameter may be present in the metadata.

In the method of encoding video according to the present disclosure, when the update flag is encoded with a value indicating that the chrominance component scaling parameter is not updated for the current cycle, the chrominance component scaling parameter for the current cycle may have the same value as a value of a chrominance component scaling parameter for a previous cycle.

In accordance with another aspect of the present disclosure, there is provided a method of decoding video including decoding a texture image, and decoding metadata for the texture image. In this instance, a value of a chrominance sample decoded from the texture image is adjusted to a value within an original dynamic range based on the metadata.

In the method of decoding video according to the present disclosure, the metadata may include a chrominance component scaling parameter.

In the method of decoding video according to the present disclosure, the chrominance component scaling parameter may be decoded for each of the viewpoint images.

In the method of decoding video according to the present disclosure, the chrominance component scaling parameter may include at least one of maximum value information indicating a maximum value among chrominance component sample values in at least one viewpoint image or minimum value information indicating a minimum value among the chrominance component sample values.

In the method of decoding video according to the present disclosure, the adjusted value of the chrominance sample may be determined by scaling a value derived by multiplying the decoded value of the chrominance sample by a difference between the maximum value and the minimum value and then adding the minimum value thereto.

In the method of decoding video according to the present disclosure, the scaling may be performed based on a scaling parameter, and the metadata may further include a value indicating the scaling parameter.

In the method of decoding video according to the present disclosure, the metadata may further include an update flag indicating whether the chrominance component scaling parameter is updated for a viewpoint image of a current cycle, and when the update flag indicates that the chrominance component scaling parameter is to be updated for the current cycle, the chrominance component scaling parameter may be decoded.

In the method of decoding video according to the present disclosure, when the update flag indicates that the chrominance component scaling parameter is not updated for the current cycle, the chrominance component scaling parameter for the current cycle may be derived as the same value as a value of a chrominance component scaling parameter for a previous cycle.

In accordance with a further aspect of the present disclosure, there is provided a computer-readable recording medium storing the method of encoding video.

Technical problems to be solved by the present disclosure are not limited to the technical problems mentioned above, and other technical problems not mentioned herein may be clearly understood by those skilled in the art from the following description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 is a block diagram of an immersive video processing device according to an embodiment of the present disclosure.

FIG. 2 is a block diagram of an immersive video output device according to an embodiment of the present disclosure.

FIG. 3 is a flow chart of an immersive video processing method.

FIG. 4 is a flow chart of an atlas encoding process.

FIG. 5 is a flow chart of an immersive video output method.

FIG. 6 illustrates an example of adjusting a dynamic range of a chrominance component according to an embodiment of the present disclosure;

FIG. 7 illustrates a viewpoint image and a residual image depending on whether or not chrominance component scaling is applied; and FIGS. 8 to 10 illustrate results of improving subjective image quality of a synthesized viewport image through chrominance component scaling.

DETAILED DESCRIPTION OF THE INVENTION

As the present disclosure may make various changes and have multiple embodiments, specific embodiments are illustrated in a drawing and are described in detail in a detailed description. But, it is not to limit the present disclosure to a specific embodiment, and should be understood as including all changes, equivalents and substitutes included in an idea and a technical scope of the present disclosure. A similar reference numeral in a drawing refers to a like or similar function across multiple aspects. A shape and a size, etc. of elements in a drawing may be exaggerated for a clearer description. A detailed description on exemplary embodiments described below refers to an accompanying drawing which shows a specific embodiment as an example. These embodiments are described in detail so that those skilled in the pertinent art can implement an embodiment. It should be understood that a variety of embodiments are different each other, but they do not need to be mutually exclusive. For example, a specific shape, structure and characteristic described herein may be implemented in other embodiment without departing from a scope and a spirit of the present disclosure in connection with an embodiment. In addition, it should be understood that a position or an arrangement of an individual element in each disclosed embodiment may be changed without departing from a scope and a spirit of an embodiment. Accordingly, a detailed description described below is not taken as a limited meaning and a scope of exemplary embodiments, if properly described, are limited only by an accompanying claim along with any scope equivalent to that claimed by those claims.

In the present disclosure, a term such as first, second, etc. may be used to describe a variety of elements, but the elements should not be limited by the terms. The terms are used only to distinguish one element from other element. For example, without getting out of a scope of a right of the present disclosure, a first element may be referred to as a second element and likewise, a second element may be also referred to as a first element. A term of and/or includes a combination of a plurality of relevant described items or any item of a plurality of relevant described items.

When an element in the present disclosure is referred to as being "connected" or "linked" to another element, it should be understood that it may be directly connected or linked to that another element, but there may be another element between them. Meanwhile, when an element is referred to as being "directly connected" or "directly linked" to another element, it should be understood that there is no another element between them.

As construction units shown in an embodiment of the present disclosure are independently shown to represent different characteristic functions, it does not mean that each construction unit is composed in a construction unit of separate hardware or one software. In other words, as each construction unit is included by being enumerated as each construction unit for convenience of a description, at least two construction units of each construction unit may be combined to form one construction unit or one construction unit may be divided into a plurality of construction units to perform a function, and an integrated embodiment and a separate embodiment of each construction unit are also included in a scope of a right of the present disclosure unless they are beyond the essence of the present disclosure.

A term used in the present disclosure is just used to describe a specific embodiment, and is not intended to limit the present disclosure. A singular expression, unless the context clearly indicates otherwise, includes a plural expression. In the present disclosure, it should be understood that a term such as "include" or "have", etc. is just intended to designate the presence of a feature, a number, a step, an operation, an element, a part or a combination thereof described in the present specification, and it does not exclude in advance a possibility of presence or addition of one or more other features, numbers, steps, operations, elements, parts or their combinations. In other words, a description of "including" a specific configuration in the present disclosure does not exclude a configuration other than a corresponding configuration, and it means that an additional configuration may be included in a scope of a technical idea of the present disclosure or an embodiment of the present disclosure.

Some elements of the present disclosure are not a necessary element which performs an essential function in the present disclosure and may be an optional element for just improving performance. The present disclosure may be implemented by including only a construction unit which is necessary to implement essence of the present disclosure except for an element used just for performance improvement, and a structure including only a necessary element except for an optional element used just for performance improvement is also included in a scope of a right of the present disclosure.

Hereinafter, an embodiment of the present disclosure is described in detail by referring to a drawing. In describing an embodiment of the present specification, when it is determined that a detailed description on a relevant disclosed configuration or function may obscure a gist of the present specification, such a detailed description is omitted, and the same reference numeral is used for the same element in a drawing and an overlapping description on the same element is omitted.

An immersive video, when a user's viewing position is changed, refers to a video that a viewport image may be also dynamically changed. In order to implement an immersive video, a plurality of input images are required. Each of a plurality of input images may be referred to as a source image or a view image. A different view index may be assigned to each view image. An immersive image may be composed of images each of which has different view, thus, the immersive video can also be referred to as multi-view image.

An immersive video may be classified into 3DoF (Degree of Freedom), 3DoF+, Windowed-6DoF or 6DoF type, etc. A 3DoF-based immersive video may be implemented by using only a texture image. On the other hand, in order to render an immersive video including depth information such as 3DoF+ or 6DoF, etc., a depth image (or, a depth map) as well as a texture image is also required.

It is assumed that embodiments described below are for immersive video processing including depth information such as 3DoF+ and/or 6DoF, etc. In addition, it is assumed that a view image is configured with a texture image and a depth image.

FIG. 1 is a block diagram of an immersive video processing device according to an embodiment of the present disclosure.

In reference to FIG. 1, an immersive video processing device according to the present disclosure may include a view optimizer 110, an atlas generation unit 120, a metadata generation unit 130, an image encoding unit 140 and a bitstream generation unit 150.

An immersive video processing device receives a plurality of pairs of images, a camera intrinsic parameters and a camera extrinsic parameter as an input data to encode an immersive video. Here, a plurality of pairs of images include a texture image (Attribute component) and a depth image (Geometry component). Each pair may have a different view. Accordingly, a pair of input images may be referred to as a view image. Each of view images may be divided by an index. In this case, an index assigned to each view image may be referred to as a view or a view index.

A camera intrinsic parameters includes a focal distance, a position of a principal point, etc. and a camera extrinsic parameters includes translations, rotations, etc. of a camera. A camera intrinsic parameters and a camera extrinsic parameters may be treated as a camera parameter or a view parameter.

A view optimizer 110 partitions view images into a plurality of groups. As view images are partitioned into a plurality of groups, independent encoding processing per each group may be performed. In an example, view images captured by N spatially consecutive cameras may be classified into one group. Thereby, view images that depth information is relatively coherent may be put in one group and accordingly, rendering quality may be improved.

In addition, by removing dependence of information between groups, a spatial random access service which performs rendering by selectively bringing only information in a region that a user is watching may be made available.

Whether view images will be partitioned into a plurality of groups may be optional.

In addition, a view optimizer 110 may classify view images into a basic image and an additional image. A basic image represents an image which is not pruned as a view image with a highest pruning priority and an additional image represents a view image with a pruning priority lower than a basic image.

A view optimizer 110 may determine at least one of view images as a basic image. A view image which is not selected as a basic image may be classified as an additional image.

A view optimizer 110 may determine a basic image by considering a view position of a view image. In an example, a view image whose view position is the center among a plurality of view images may be selected as a basic image.

Alternatively, a view optimizer 110 may select a basic image based on camera parameters. Specifically, a view optimizer 110 may select a basic image based on at least one of a camera index, a priority between cameras, a position of a camera or whether it is a camera in a region of interest.

In an example, at least one of a view image with a smallest camera index, a view image with a largest camera index, a view image with the same camera index as a predefined value, a view image captured by a camera with a highest priority, a view image captured by a camera with a lowest priority, a view image captured by a camera at a predefined position (e.g., a central position) or a view image captured by a camera in a region of interest may be determined as a basic image.

Alternatively, a view optimizer 110 may determine a basic image based on quality of view images. In an example, a view image with highest quality among view images may be determined as a basic image.

Alternatively, a view optimizer 110 may determine a basic image by considering an overlapping data rate of other view images after inspecting a degree of data redundancy between view images. In an example, a view image with a highest overlapping data rate with other view images or a view image with a lowest overlapping data rate with other view images may be determined as a basic image.

A plurality of view images may be also configured as a basic image.

An Atlas generation unit 120 performs pruning and generates a pruning mask. And, it extracts a patch by using a pruning mask and generates an atlas by combining a basic image and/or an extracted patch. When view images are partitioned into a plurality of groups, the process may be performed independently per each group.

A generated atlas may be composed of a texture atlas and a depth atlas. A texture atlas represents a basic texture image and/or an image that texture patches are combined and a depth atlas represents a basic depth image and/or an image that depth patches are combined.

An atlas generation unit 120 may include a pruning unit 122, an aggregation unit 124 and a patch packing unit 126.

A pruning unit 122 performs pruning for an additional image based on a pruning priority. Specifically, pruning for an additional image may be performed by using a reference image with a higher pruning priority than an additional image.

A reference image includes a basic image. In addition, according to a pruning priority of an additional image, a reference image may further include other additional image.

Whether an additional image may be used as a reference image may be selectively determined. In an example, when an additional image is configured not to be used as a reference image, only a basic image may be configured as a reference image.

On the other hand, when an additional image is configured to be used as a reference image, a basic image and other additional image with a higher pruning priority than an additional image may be configured as a reference image.

Through a pruning process, redundant data between an additional image and a reference image may be removed. Specifically, through a warping process based on a depth image, data overlapped with a reference image may be removed in an additional image. In an example, when a depth value between an additional image and a reference image is compared and that difference is equal to or less than a threshold value, it may be determined that a corresponding pixel is redundant data.

As a result of pruning, a pruning mask including information on whether each pixel in an additional image is valid or invalid may be generated. A pruning mask may be a binary image which represents whether each pixel in an additional image is valid or invalid. In an example, in a pruning mask, a pixel determined as overlapping data with a reference image may have a value of 0 and a pixel determined as non-overlapping data with a reference image may have a value of 1.

While a non-overlapping region may have a non-square shape, a patch is limited to a square shape. Accordingly, a patch may include an invalid region as well as a valid region. Here, a valid region refers to a region composed of non-overlapping pixels between an additional image and a reference image. In other words, a valid region represents a region that includes data which is included in an additional image, but is not included in a reference image. An invalid region refers to a region composed of overlapping pixels between an additional image and a reference image. A pixel/data included by a valid region may be referred to as a valid pixel/valid data and a pixel/data included by an invalid region may be referred to as an invalid pixel/invalid data.

An aggregation unit 124 combines a pruning mask generated in a frame unit in an intra-period unit.

In addition, an aggregation unit 124 may extract a patch from a combined pruning mask image through a clustering process. Specifically, a square region including valid data in a combined pruning mask image may be extracted as a patch. Regardless of a shape of a valid region, a patch is extracted in a square shape, so a patch extracted from a square valid region may include invalid data as well as valid data.

In this case, an aggregation unit 124 may repartition a L-shaped or C-shaped patch which reduces encoding efficiency. Here, a L-shaped patch represents that distribution of a valid region is L-shaped and a C-shaped patch represents that distribution of a valid region is C-shaped.

When distribution of a valid region is L-shaped or C-shaped, a region occupied by an invalid region in a patch is relatively large. Accordingly, a L-shaped or C-shaped patch may be partitioned into a plurality of patches to improve encoding efficiency.

For an unpruned view image, a whole view image may be treated as one patch. Specifically, a whole 2D image which develops an unpruned view image in a predetermined projection format may be treated as one patch. A projection format may include at least one of an Equirectangular Projection Format (ERP), a Cube-map or a Perspective Projection Format.

Here, an unpruned view image refers to a basic image with a highest pruning priority. Alternatively, an additional image that there is no overlapping data with a reference image and a basic image may be defined as an unpruned view image. Alternatively, regardless of whether there is overlapping data with a reference image, an additional image arbitrarily excluded from a pruning target may be also defined as an unpruned view image. In other words, even an additional image that there is data overlapping with a reference image may be defined as an unpruned view image.

A packing unit 126 packs a patch in a rectangle image. In patch packing, deformation such as size transform, rotation, or flip, etc. of a patch may be accompanied. An image that patches are packed may be defined as an atlas.

Specifically, a packing unit 126 may generate a texture atlas by packing a basic texture image and/or texture patches and may generate a depth atlas by packing a basic depth image and/or depth patches.

For a basic image, a whole basic image may be treated as one patch. In other words, a basic image may be packed in an atlas as it is. When a whole image is treated as one patch, a corresponding patch may be referred to as a complete image (complete view) or a complete patch.

The number of atlases generated by an atlas generation unit 120 may be determined based on at least one of an arrangement structure of a camera rig, accuracy of a depth map or the number of view images.

A metadata generation unit 130 generates metadata for image synthesis. Metadata may include at least one of camera-related data, pruning-related data, atlas-related data or patch-related data.

Pruning-related data includes information for determining a pruning priority between view images. In an example, at least one of a flag representing whether a view image is a root node or a flag representing whether a view image is a leaf node may be encoded. A root node represents a view image with a highest pruning priority (i.e., a basic image) and a leaf node represents a view image with a lowest pruning priority.

When a view image is not a root node, a parent node index may be additionally encoded. A parent node index may represent an image index of a view image, a parent node.

Alternatively, when a view image is not a leaf node, a child node index may be additionally encoded. A child node index may represent an image index of a view image, a child node.

Atlas-related data may include at least one of size information of an atlas, number information of an atlas, priority information between atlases or a flag representing whether an atlas includes a complete image. A size of an atlas may include at least one of size information of a texture atlas and size information of a depth atlas. In this case, a flag representing whether a size of a depth atlas is the same as that of a texture atlas may be additionally encoded. When a size of a depth atlas is different from that of a texture atlas, reduction ratio information of a depth atlas (e.g., scaling-related information) may be additionally encoded. Atlas-related information may be included in a "View parameters list" item in a bitstream.

In an example, geometry_scale_enabled_flag, a syntax representing whether it is allowed to reduce a depth atlas, may be encoded/decoded. When a value of a syntax geometry_scale_enabled_flag is 0, it represents that it is not allowed to reduce a depth atlas. In this case, a depth atlas has the same size as a texture atlas.

When a value of a syntax geometry_scale_enabled_flag is 1, it represents that it is allowed to reduce a depth atlas. In this case, information for determining a reduction ratio of a depth atlas may be additionally encoded/decoded. In an example, geometry_scaling_factor_x, a syntax representing a horizontal directional reduction ratio of a depth atlas, and geometry_scaling_factor_y, a syntax representing a vertical directional reduction ratio of a depth atlas, may be additionally encoded/decoded.

An immersive video output device may restore a reduced depth atlas to its original size after decoding information on a reduction ratio of a depth atlas.

Patch-related data includes information for specifying a position and/or a size of a patch in an atlas image, a view image to which a patch belongs and a position and/or a size of a patch in a view image. In an example, at least one of position information representing a position of a patch in an atlas image or size information representing a size of a patch in an atlas image may be encoded. In addition, a source index for identifying a view image from which a patch is derived may be encoded. A source index represents an index of a view image, an original source of a patch. In addition, position information representing a position corresponding to a patch in a view image or position information representing a size corresponding to a patch in a view image may be encoded. Patch-related information may be included in an "Atlas data" item in a bitstream.

An image encoding unit 140 encodes an atlas. When view images are classified into a plurality of groups, an atlas may be generated per group. Accordingly, image encoding may be performed independently per group.

An image encoding unit 140 may include a texture image encoding unit 142 encoding a texture atlas and a depth image encoding unit 144 encoding a depth atlas.

A bitstream generation unit 150 generates a bitstream based on encoded image data and metadata. A generated bitstream may be transmitted to an immersive video output device.

FIG. 2 is a block diagram of an immersive video output device according to an embodiment of the present disclosure.

In reference to FIG. 2, an immersive video output device according to the present disclosure may include a bitstream parsing unit 210, an image decoding unit 220, a metadata processing unit 230 and an image synthesizing unit 240.

A bitstream parsing unit 210 parses image data and metadata from a bitstream. Image data may include data of an encoded atlas. When a spatial random access service is supported, only a partial bitstream including a watching position of a user may be received.

An image decoding unit 220 decodes parsed image data. An image decoding unit 220 may include a texture image decoding unit 222 for decoding a texture atlas and a depth image decoding unit 224 for decoding a depth atlas.

A metadata processing unit 230 unformats parsed metadata.

Unformatted metadata may be used to synthesize a specific view image. In an example, when motion information of a user is input to an immersive video output device, a metadata processing unit 230 may determine an atlas necessary for image synthesis and patches necessary for image synthesis and/or a position/a size of the patches in an atlas and others to reproduce a viewport image according to a user's motion.

An image synthesizing unit 240 may dynamically synthesize a viewport image according to a user's motion. Specifically, an image synthesizing unit 240 may extract patches required to synthesize a viewport image from an atlas by using information determined in a metadata processing unit 230 according to a user's motion. Specifically, a viewport image may be generated by extracting patches extracted from an atlas including information of a view image required to synthesize a viewport image and the view image in the atlas and synthesizing extracted patches.

FIGS. 3 and 5 show a flow chart of an immersive video processing method and an immersive video output method, respectively.

In the following flow charts, what is italicized or underlined represents input or output data for performing each step. In addition, in the following flow charts, an arrow represents processing order of each step. In this case, steps without an arrow indicate that temporal order between corresponding steps is not determined or that corresponding steps may be processed in parallel. In addition, it is also possible to process or output an immersive video in order different from that shown in the following flow charts.

An immersive video processing device may receive at least one of a plurality of input images, a camera internal variable and a camera external variable and evaluate depth map quality through input data S301. Here, an input image may be configured with a pair of a texture image (Attribute component) and a depth image (Geometry component).

An immersive video processing device may classify input images into a plurality of groups based on positional proximity of a plurality of cameras S302. By classifying input images into a plurality of groups, pruning and encoding may be performed independently between adjacent cameras whose depth value is relatively coherent. In addition, through the process, a spatial random access service that rendering is performed by using only information of a region a user is watching may be enabled.

But, the above-described S301 and S302 are just an optional procedure and this process is not necessarily performed.

When input images are classified into a plurality of groups, procedures which will be described below may be performed independently per group.

An immersive video processing device may determine a pruning priority of view images S303. Specifically, view images may be classified into a basic image and an additional image and a pruning priority between additional images may be configured.

Subsequently, based on a pruning priority, an atlas may be generated and a generated atlas may be encoded S304. A process of encoding atlases is shown in detail in FIG. 4.

Specifically, a pruning parameter (e.g., a pruning priority, etc.) may be determined S311 and based on a determined pruning parameter, pruning may be performed for view images S312. As a result of pruning, a basic image with a highest priority is maintained as it is originally. On the other hand, through pruning for an additional image, overlapping data between an additional image and a reference image is removed. Through a warping process based on a depth image, overlapping data between an additional image and a reference image may be removed.

As a result of pruning, a pruning mask may be generated. If a pruning mask is generated, a pruning mask is combined in a unit of an intra-period S313. And, a patch may be extracted from a texture image and a depth image by using a combined pruning mask S314. Specifically, a combined pruning mask may be masked to texture images and depth images to extract a patch.

In this case, for an non-pruned view image (e.g., a basic image), a whole view image may be treated as one patch.

Subsequently, extracted patches may be packed S315 and an atlas may be generated S316. Specifically, a texture atlas and a depth atlas may be generated.

In addition, an immersive video processing device may determine a threshold value for determining whether a pixel is valid or invalid based on a depth atlas S317. In an example, a pixel that a value in an atlas is smaller than a threshold value may correspond to an invalid pixel and a pixel that a value is equal to or greater than a threshold value may correspond to a valid pixel. A threshold value may be determined in a unit of an image or may be determined in a unit of a patch.

For reducing the amount of data, a size of a depth atlas may be reduced by a specific ratio S318. When a size of a depth atlas is reduced, information on a reduction ratio of a depth atlas (e.g., a scaling factor) may be encoded. In an immersive video output device, a reduced depth atlas may be restored to its original size through a scaling factor and a size of a texture atlas.

Metadata generated in an atlas encoding process (e.g., a parameter set, a view parameter list or atlas data, etc.) and SEI (Supplemental Enhancement Information) are combined S305. In addition, a sub bitstream may be generated by encoding a texture atlas and a depth atlas respectively S306. And, a single bitstream may be generated by multiplexing encoded metadata and an encoded atlas S307.

An immersive video output device demultiplexes a bitstream received from an immersive video processing device S501. As a result, video data, i.e., atlas data and metadata may be extracted respectively S502 and S503.

An immersive video output device may restore an atlas based on parsed video data S504. In this case, when a depth atlas is reduced at a specific ratio, a depth atlas may be scaled to its original size by acquiring related information from metadata S505.

When a user's motion occurs, based on metadata, an atlas required to synthesize a viewport image according to a user's motion may be determined and patches included in the atlas may be extracted. A viewport image may be generated and rendered S506. In this case, in order to synthesize viewpoint image with the patches, size/position information of each patch and a camera parameter, etc. may be used.

A texture atlas may include a luma component and a chrominance component. Meanwhile, depending on the scene composition, there may be cases where a dynamic range for the chrominance component is relatively narrow.

In order to encode/decode chrominance values belonging to a narrow dynamic range, a size of a quantization parameter needs to be set to a small value, which causes a problem that reduces encoding/decoding efficiency of immersive video. That is, when the chrominance values fall within the narrow dynamic range, large loss of the chrominance component occurs during a quantization process, which has a problem of deteriorating subjective image quality of a synthesized viewport image.

To solve the above problems, the present disclosure proposes a method of improving encoding/decoding efficiency of immersive video and improving subjective image quality of a synthesized viewport image by scaling a dynamic range of a chrominance component.

FIG. 6 illustrates an example of adjusting a dynamic range of a chrominance component according to an embodiment of the present disclosure.

An example of FIG. 6A illustrates a histogram distribution before the dynamic range of the chrominance component is adjusted (that is, original).

An example of FIG. 6B illustrates an example in which the dynamic range of the chrominance component is expanded through chrominance component scaling.

As in the examples illustrated in FIG. 6, the dynamic range of the chrominance component may be expanded through chrominance component scaling.

Equation 1 and Equation 2 show examples of modifying a sample value of the chrominance component within an original dynamic range to a sample value of the chrominance component within a new dynamic range.

$$chromaUsample = ((chromaUSample' \ll attributeBitDepth) - \quad \text{[Equation 1]}$$
$$cs\_u\_min[v]))/cs\_u\_max[v] - cs\_u\_min[v]))$$

$$chromaVsample = ((chromaVSample' \ll attributeBitDepth) - \quad \text{[Equation 2]}$$
$$cs\_v\_min[v]))/cs\_v\_max[v] - cs\_v\_min[v]))$$

In Equation 1, chromaUsample' represents a sample value of a chrominance component U within the original dynamic range, and chromaUsample represents a sample value of the chrominance component U within the changed dynamic range. In addition, cs_u_max and cs_u_min represent a maximum value and a minimum value of the original dynamic range before change for the chrominance component U, respectively.

In Equation 2, chromaVsample' represents a sample value of a chrominance component V within the original dynamic range, and chromaVsample represents a sample value of the chrominance component V within the changed dynamic range. In addition, cs_v_max and cs_v_min represent a maximum value and a minimum value of the changed dynamic range for the chrominance component V, respectively.

attributeBitDepth represents a shifting parameter and may be determined based on a bit depth for a texture component (that is, texture atlas). Alternatively, information representing a value of a variable attritubeBitDepth may be explicitly encoded and signaled.

By expanding the dynamic range of the chrominance component, a more colorful viewport image may be expressed.

FIG. 7 illustrates a viewpoint image and a residual image depending on whether or not chrominance component scaling is applied.

FIG. 7A illustrates a viewpoint image and a residual image before chrominance component scaling is applied, and FIG. 7B illustrates a viewpoint image and a residual image after chrominance component scaling is applied.

FIGS. 8 to 10 illustrate results of improving subjective image quality of a synthesized viewport image through chrominance component scaling.

FIGS. 8 to 10A illustrate original images, and FIGS. 8 to 10B illustrate viewport images generated without scaling the chrominance component. FIGS. 8 to 10C illustrate viewport images generated through scaling of the chrominance component.

When FIGS. 8 to 10B and FIG. 10C are compared, it can be seen that the viewport images illustrated in FIGS. 8 to 10C have less differences from the original image when compared to the viewport images illustrated in FIG. 8 to FIG. 10B. Meanwhile, when the dynamic range of the chrominance component is expanded and encoded/decoded, the decoder needs to reduce the dynamic range of the chrominance component in the decoded image back to an original range. To this end, information related to chrominance component scaling may be encoded and signaled. Specifically, metadata related to chrominance component scaling may be encoded and signaled along with encoded image data.

Hereinafter, an encoding/decoding structure of metadata related to chrominance component scaling will be examined in detail.

Information indicating whether a chrominance component scaling parameter is present may be encoded/decoded. The information may be a 1-bit flag, and Table 1 shows a syntax structure including the flag.

TABLE 1

| casps_miv_extension( ) { | Descriptor |
|---|---|
| casme_depth_low_quality_flag | u(1) |
| casme_depth_quantization_params_present_flag | u(1) |
| casme_chroma_scaling_present_flag | u(1) |
| casme_vui_params_present_flag | u(1) |
| if( casme_vui_params_present_flag ) | |
| vui_parameters( ) | |
| } | |

In Table 1, syntax casme_chroma_scaling_present_flag indicates whether a parameter related to chroma scaling is included in a bitstream. When the syntax casme_chroma_scaling_present_flag has a value of 1, the syntax indicates that the chrominance component scaling parameter is present in the bitstream. On the other hand, when the syntax casme_chroma_scaling_present_flag has a value of 0, the syntax indicates that the chrominance component scaling parameter is not present in the bitstream.

Meanwhile, the syntax casme_chroma_scaling_present_flag may be encoded/decoded through an atlas-related sequence parameter set (for example, Common Atlas Sequence Parameter Set).

When the syntax casme_chroma_scaling_present_flag has the value of 1, the chrominance component scaling parameter may be additionally encoded/decoded at a lower level referring to this syntax structure (that is, the sequence parameter set). Here, the lower level may include an atlas level (for example, Common Atlas frame syntax structure) or a patch level (for example, patch data unit syntax structure).

The chrominance component scaling parameter may include information for changing/restoring a restored chrominance component sample value to a sample value within the original dynamic range. For example, in a YUV image, for each of a U-component and a V-component, minimum value information indicating a minimum value of a chrominance component for each viewpoint image and maximum value information indicating a maximum value of the chrominance component may be encoded and signaled. Table 2 illustrates a syntax structure including information for restoring the dynamic range of the chrominance component.

TABLE 2

| chroma_scaling( v ) { | Descriptor |
|---|---|
| cs_u_min[ v ] | u(16) |
| cs_u_max[ v ] | u(16) |
| cs_v_min[ v ] | u(16) |
| cs_v_max[ v ] | u(16) |
| } | |

In Table 2, syntax cs_u_min[v] represents a minimum value of a first chrominance component (U) in a viewpoint image having an index of v, and cs_u_max[v] represents a maximum value of the first chrominance component (U) in the viewpoint image having the index of v. Here, the minimum and maximum values may represent minimum and maximum values of the original dynamic range for the first chrominance component.

In addition, syntax cs_v_min[v] represents a minimum value of a second chrominance component (V) in the viewpoint image having the index of v, and cs_v_max[v] represents a maximum value of the second chrominance component (V) in the viewpoint image having the index of v. Here, the minimum and maximum values may represent minimum and maximum values of the original dynamic range for the second chrominance component.

In Table 2, four syntaxes are illustrated as being encoded with a fixed length of 16 bits. As another example, after encoding/decoding information indicating the bit length of the four syntaxes, the four syntaxes may be encoded/decoded according to the number of bits indicated by the information.

As an example, syntax chroma_scaling_bit_depth_minus1 indicating the bit length of the four syntaxes may be encoded/decoded. The syntax chroma_scaling_bit_depth_minus1 represents a value obtained by subtracting 1 from the bit length of the four syntaxes. The bit length (that is, the number of bits) for expressing each of the four syntaxes may be a value obtained by adding 1 to a value of the syntax chroma_scaling_bit_depth_minus1.

The minimum and maximum values of the chrominance component may be values determined for an entire area of a picture (that is, the viewpoint image). In other words, the original dynamic range may be confirmed for the entire area of the picture to encode the minimum and maximum values of the chrominance component.

Meanwhile, the chrominance component scaling parameter may be encoded and signaled at every predetermined cycle. In this case, the minimum and maximum values of the chrominance component may be values determined for an entire picture group included in a predetermined cycle. Here, the predetermined cycle may be a time domain including at least one picture. As an example, the predetermined cycle may be an intra cycle including a single picture or a plurality of pictures. Alternatively, the predetermined cycle may be defined as a time domain including a sequence or at least one Group of Pictures (GOP).

Meanwhile, information indicating whether the chrominance component scaling parameter is updated compared to a previous cycle may be encoded and signaled. Here, the previous cycle may represent a picture or a set of pictures that has been encoded/decoded prior to a current cycle.

The information may be a 1-bit flag indicating whether the chrominance component scaling parameter is updated. Table 3 shows a syntax structure including the flag.

TABLE 3

| caf_miv_extension( ) { | Descriptor |
|---|---|
| if( nal_unit_type == NAL_CAF_IDR ) { | |
| miv_view_params_list( ) | |
| } else { | |
| came_update_extrinsics_flag | u(1) |
| came_update_intrinsics_flag | u(1) |
| if( casme_depth_quantization_params_present_flag ) | |
| came_update_depth_quantization_flag | u(1) |
| if( casme_chroma_scaling_present_flag ) | |
| came_update_chroma_scaling_flag | u(1) |
| if( came_update_extrinsics_flag ) | |
| miv_view_params_update_extrinsics( ) | |
| if( came_update_intrinsics_flag ) | |
| miv_view_params_update_intrinsics( ) | |
| if( came_update_depth_quantization_flag ) | |
| miv_view_params_update_depth_quantization( ) | |

TABLE 3-continued

| caf_miv_extension( ) { | Descriptor |
|---|---|
|     if( came_update_chroma_scaling_flag ) | |
|         miv_view_params_update_chroma_scaling( ) | |
|     } | |
| } | |

In Table 3, syntax came_update_chroma_scaling_flag indicates whether a chrominance component scaling-related parameter is updated. A value of came_update_chroma_s-caling_flag being 0 may indicate that the chrominance component scaling parameter is not updated. In this case, the chrominance component scaling parameter, that is, the syntax structure of Table 2, may not be present in the bitstream. When came_update_chroma_scaling_flag has a value of 0, a chrominance component scaling parameter of a previous cycle and a chrominance component scaling parameter of a current cycle may be derived in the same way.

On the other hand, a value of case_update_chroma_scal-ing_flag being 1 indicates that the chrominance component scaling parameter is updated. In this case, the chrominance component scaling parameter, that is, the syntax structure of Table 2, may be present in the bitstream.

For example, as in the example of Table 3, when came_update_chroma_scaling_flag is 1, a viewpoint parameter list (that is, mvp_view_params_list) for encoding/decoding the chrominance component scaling parameter may be called.

Syntax came_update_scaling_flag may be included in an atlas frame-related MIV extension syntax structure (for example, caf_miv_extension).

Through the viewpoint parameter list, information about each viewpoint image may be independently encoded/decoded. As an example, the chrominance component scaling parameter may be encoded/decoded for each viewpoint image. Table 4 shows an example in which the chrominance component scaling parameter is encoded/decoded for each viewpoint image.

In Table 4, mvp_num_views_minus1 represents a value obtained by subtracting 1 from the number of viewpoint images. As in the example shown in Table 4, when cas-me_chroma_scaling_present_flag has a value of 1, a syntax structure chroma_scaling (v) including the chrominance component scaling parameter may be called for each of viewpoint images having indices from 0 to mvp_num_views_minus1.

A chrominance component value may be changed/re-stored to a value within the original dynamic range based on a parameter related to chrominance component scaling. Equation 3 and Equation 4 show examples of restoring the values of the chrominance component for the U-component and V-component, respectively.

$$chromaUSample' = \qquad\qquad\qquad\text{[Equation 3]}$$
$$\left(chromaUSample * \left(cs_{u_{max[v]}} - cs_{u_{min[v]}}\right) + cs_{u_{min[v]}}\right) \gg$$
$$attributeBitDepth$$

$$chromaUSample' = \qquad\qquad\qquad\text{[Equation 4]}$$
$$\left(chromaUSample * \left(cs_{u_{max[v]}} - cs_{u_{min[v]}}\right) + cs_{u_{min[v]}}\right) \gg$$
$$attributeBitDepth$$

In Equation 3, chromaUSample represents a U-component sample value decoded from a texture atlas, and chromaUsample' represents a U-component sample value restored through dynamic range adjustment.

In Equation 4, chromaVSample represents a V-component sample value decoded from a texture atlas, and chromaUsample' represents a U-component sample value restored through dynamic range adjustment.

attributeBitDepth represents a shifting parameter and may be determined based on a bit depth for a texture component (that is, texture atlas). Alternatively, information representing a value of the variable attritubeBitDepth may be explicitly encoded and signaled.

TABLE 4

| miv_view_params_list( ) { | Descriptor |
|---|---|
|   mvp_num_views_minus1 | u(16) |
|   mvp_explicit_view_id_flag | u(1) |
|   if( mvp_explicit_view_id_flag ) | |
|     for( v = 0; v <= mvp_num_views_minus1; v++ ) | |
|       mvp_view_id[ v ] | u(16) |
|   for( v = 0; v <= mvp_num_views_minus1; v++ ) { | |
|     camera_extrinsics( v ) | |
|     mvp_inpaint_flag[ v ] | u(1) |
|   } | |
|   mvp_intrinsic_params_equal_flag | u(1) |
|   for( v = 0; v <= mvp_intrinsic_params_equal_flag ? 0 : mvp_num_views_minus1; v++ ) | |
|     camera_intrinsics( v ) | |
|     if( casme_depth_quantization_params_present_flag ) { | |
|       mvp_depth_quantization_params_equal_flag | u(1) |
|     for( v = 0; v <= mvp_depth_quantization_equal_flag ? 0 : mvp_num_views_minus1; v++ ) | |
|       depth_quantization( v ) | |
|     } | |
|   mvp_pruning_graph_params_present_flag | u(1) |
|   if ( mvp_pruning_graph_params_present_flag ) | |
|     for( v = 0; v <= mvp_num_views_minus1; v++ ) | |
|     pruning_parents( v ) | |
|   if ( casme_chroma_scaling_present_flag ) | |
|     for( v = 0; v <= mvp_num_views_minus1; v++ ) | |
|     chroma_scaling( v ) | |
| } | |

An image for a target viewpoint (that is, a viewport image) may be synthesized using a chrominance component sample value changed to the original dynamic range.

The above example illustrates that, when the syntax casme_chroma_scaling_present_flag is 1, the chrominance component scaling parameter is encoded/decoded for each of a plurality of viewpoint images.

As another example, the chrominance component scaling parameter may be updated for only some viewpoint image(s) among a plurality of viewpoint images included in the bitstream.

For example, when came_update_chroma_scaling_flag has a value of 1, information indicating the number of viewpoint images for which the chrominance component scaling parameter needs to be updated may be encoded and signaled. As an example, syntax came_num_update_chroma_scaling_view_minus1 may be encoded/decoded through the atlas frame-related MIV extension syntax structure. The syntax represents a value obtained by subtracting 1 from the number of viewpoint images for which the chrominance component scaling parameter needs to be updated.

When came_update_chroma_scaling_flag is 1, it is possible to encode/decode information indicating whether the chrominance component scaling parameter needs to be updated for each viewpoint image. For example, it is possible to encode/decode syntax mvp_update_chroma_scaling_present_flag indicating whether the chrominance component scaling parameter needs to be updated for a viewpoint image having an index of v through the viewpoint parameter list. Only when the syntax mvp_update_chroma_scaling_present_flag is 1, may a syntax structure (that is, Table 3) including the chrominance component scaling parameter be called. Meanwhile, the number of viewpoint images for which mvp_update_chroma_scaling_present_flag has the value of 1 may be equal to the number of viewpoint images for which the chrominance component scaling parameter indicated by came_num_update_chroma_scaling_view_minus1 needs to be updated.

The above example illustrates that the chrominance component scaling parameter is encoded/decoded for each viewpoint image. Unlike the example, the chrominance component scaling parameter may be encoded/decoded in units of patches, slices, tiles, or subpictures.

Meanwhile, the above-described embodiments illustrate that the dynamic range of the chrominance component is changed through chrominance component scaling when the texture atlas is encoded/decoded. However, chrominance component scaling described in the present disclosure may be used to encode/decode not only the texture atlas but also other images including the chrominance component, for example, a general 2D image (that is, texture image).

That is, as in the example illustrated in FIG. 3, the chrominance component scaling technique described in the present disclosure may be applied to a general 2D image encoded without performing a preprocessing step to generate an atlas image. In this case, chrominance component scaling-related information may be encoded and signaled as metadata of the encoded 2D image.

According to the present disclosure, it is possible to improve quality of a synthetized image by expanding a dynamic range of a chrominance component.

According to the present disclosure, when a dynamic range of a chrominance component is changed, quality of a synthetized image may be improved by encoding/decoding metadata related to a dynamic range change.

Effects obtainable from the present disclosure are not limited to the above-mentioned effects, and other effects not mentioned herein may be clearly understood by those skilled in the art from the above description.

A name of syntax elements introduced in the above-described embodiments is only temporarily given to describe embodiments according to the present disclosure. Syntax elements may be named with a name different from that proposed in the present disclosure.

A component described in illustrative embodiments of the present disclosure may be implemented by a hardware element. For example, the hardware element may include at least one of a digital signal processor (DSP), a processor, a controller, an application-specific integrated circuit (ASIC), a programmable logic element such as a FPGA, a GPU, other electronic device, or a combination thereof. At least some of functions or processes described in illustrative embodiments of the present disclosure may be implemented by a software and a software may be recorded in a recording medium. A component, a function and a process described in illustrative embodiments may be implemented by a combination of a hardware and a software.

A method according to an embodiment of the present disclosure may be implemented by a program which may be performed by a computer and the computer program may be recorded in a variety of recording media such as a magnetic Storage medium, an optical readout medium, a digital storage medium, etc.

A variety of technologies described in the present disclosure may be implemented by a digital electronic circuit, a computer hardware, a firmware, a software or a combination thereof. The technologies may be implemented by a computer program product, i.e., a computer program tangibly implemented on an information medium or a computer program processed by a computer program (e.g., a machine readable storage device (e.g.: a computer readable medium) or a data processing device) or a data processing device or implemented by a signal propagated to operate a data processing device (e.g., a programmable processor, a computer or a plurality of computers).

Computer program(s) may be written in any form of a programming language including a compiled language or an interpreted language and may be distributed in any form including a stand-alone program or module, a component, a subroutine, or other unit suitable for use in a computing environment. A computer program may be performed by one computer or a plurality of computers which are spread in one site or multiple sites and are interconnected by a communication network.

An example of a processor suitable for executing a computer program includes a general-purpose and special-purpose microprocessor and one or more processors of a digital computer. Generally, a processor receives an instruction and data in a read-only memory or a random access memory or both of them. A component of a computer may include at least one processor for executing an instruction and at least one memory device for storing an instruction and data. In addition, a computer may include one or more mass storage devices for storing data, e.g., a magnetic disk, a magnet-optical disk or an optical disk, or may be connected to the mass storage device to receive and/or transmit data. An example of an information medium suitable for implementing a computer program instruction and data includes a semiconductor memory device (e.g., a magnetic medium such as a hard disk, a floppy disk and a magnetic tape), an optical medium such as a compact disk read-only memory (CD-ROM), a digital video disk (DVD), etc., a magnet-optical medium such as a floptical disk, and a ROM (Read Only Memory), a RAM (Random Access Memory), a flash memory, an EPROM (Erasable Programmable ROM), an EEPROM (Electrically Erasable Programmable ROM) and other known computer readable medium. A processor and a memory may be complemented or integrated by a special-purpose logic circuit.

A processor may execute an operating system (OS) and one or more software applications executed in an OS. A processor device may also respond to software execution to access, store, manipulate, process and generate data. For simplicity, a processor device is described in the singular, but those skilled in the art may understand that a processor device may include a plurality of processing elements and/or various types of processing elements. For example, a processor device may include a plurality of processors or a processor and a controller. In addition, it may configure a different processing structure like parallel processors. In addition, a computer readable medium means all media which may be accessed by a computer and may include both a computer storage medium and a transmission medium.

The present disclosure includes detailed description of various detailed implementation examples, but it should be understood that those details do not limit a scope of claims or an invention proposed in the present disclosure and they describe features of a specific illustrative embodiment.

Features which are individually described in illustrative embodiments of the present disclosure may be implemented by a single illustrative embodiment. Conversely, a variety of features described regarding a single illustrative embodiment in the present disclosure may be implemented by a combination or a proper sub-combination of a plurality of illustrative embodiments. Further, in the present disclosure, the features may be operated by a specific combination and may be described as the combination is initially claimed, but in some cases, one or more features may be excluded from a claimed combination or a claimed combination may be changed in a form of a sub-combination or a modified sub-combination.

Likewise, although an operation is described in specific order in a drawing, it should not be understood that it is necessary to execute operations in specific turn or order or it is necessary to perform all operations in order to achieve a desired result. In a specific case, multitasking and parallel processing may be useful. In addition, it should not be understood that a variety of device components should be separated in illustrative embodiments of all embodiments and the above-described program component and device may be packaged into a single software product or multiple software products.

Illustrative embodiments disclosed herein are just illustrative and do not limit a scope of the present disclosure. Those skilled in the art may recognize that illustrative embodiments may be variously modified without departing from a claim and a spirit and a scope of its equivalent.

Accordingly, the present disclosure includes all other replacements, modifications and changes belonging to the following claim.

What is claimed is:

1. A method of encoding video, the method comprising:
encoding a texture atlas including patches of a plurality of viewpoint images; and
encoding metadata for the plurality of viewpoint images,
wherein a chrominance sample value represented in an original dynamic range in the texture atlas is encoded by modifying the chrominance sample value to be represented in a changed dynamic range,
wherein the metadata comprises a chrominance component scaling parameter for restoring the modified chrominance sample value represented in the changed dynamic range to the chrominance sample value represented in the original dynamic range, and
wherein the chrominance component scaling parameter is encoded for each of the viewpoint images.

2. The method according to claim 1, wherein the chrominance component scaling parameter comprises maximum value information of a chrominance component indicating a maximum value of chrominance sample values represented in the original dynamic range and minimum value information of a chrominance component indicating a minimum value of the chrominance sample values represented in the original dynamic range.

3. A method of decoding video, the method comprising:
decoding a texture atlas including patches of a plurality of viewpoint images; and
decoding metadata for the plurality of viewpoint images,
wherein the metadata comprises a chrominance component scaling parameter to modify a value of a chrominance sample decoded from the texture atlas to a value represented in an original dynamic range, and
wherein the chrominance component scaling parameter is decoded for each of the plurality of viewpoint images.

4. The method according to claim 3, wherein the chrominance component scaling parameter comprises maximum value information indicating a maximum value of chrominance component sample values represented in the original dynamic range of a viewpoint image and minimum value information indicating a minimum value of the chrominance component sample values represented in the original dynamic range of the viewpoint image.

5. The method according to claim 4, wherein the modified value of the chrominance sample is determined by scaling a value derived by multiplying the decoded value of the chrominance sample by a difference between the maximum value and the minimum value and then adding the minimum value thereto.

6. The method according to claim 5, wherein:
the scaling is performed based on a scaling parameter, and
the metadata further comprises a value indicating the scaling parameter.

7. A non-transitory computer-readable recording medium storing instructions that, when executed by a computer, cause the computer to carry out:
encoding a texture atlas including patches of a plurality of viewpoint images; and
encoding metadata for the plurality of viewpoint images,
wherein a chrominance sample value represented in an original dynamic range in the texture atlas is encoded by modifying the chrominance sample value to be represented in a changed dynamic range, and
wherein the metadata comprises a chrominance component scaling parameter for restoring the modified chrominance sample value represented in the changed dynamic range to the chrominance sample value represented in the original dynamic range, and
wherein the chrominance component scaling parameter is encoded for each of the viewpoint images.

* * * * *